United States Patent [19]
Huotari

[11] Patent Number: 6,053,053
[45] Date of Patent: Apr. 25, 2000

[54] MULTIPLE VORTEX FLOWMETER SYSTEM

[75] Inventor: Wendell G. Huotari, Cokato, Minn.

[73] Assignee: Rosemount Inc., Eden Prairie, Minn.

[21] Appl. No.: 09/042,089

[22] Filed: Mar. 13, 1998

[51] Int. Cl.$^7$ .................................... G01F 1/32
[52] U.S. Cl. ................................... 73/861.22; 73/861.24
[58] Field of Search ........................... 73/861.22, 861.24

[56] References Cited

U.S. PATENT DOCUMENTS

| | | | |
|---|---|---|---|
| 3,719,073 | 3/1973 | Mahon | 73/194 |
| 3,996,796 | 12/1976 | Adler et al. | 73/194 |
| 4,307,619 | 12/1981 | Herzl | 73/861.24 |
| 4,350,047 | 9/1982 | Dewey, Jr. et al. | 73/861.22 |
| 4,445,388 | 5/1984 | Herzl et al. | 73/861.24 |
| 4,703,659 | 11/1987 | Lew et al. | 73/861.24 |
| 4,735,094 | 4/1988 | Marsh | 73/861.24 |
| 4,754,649 | 7/1988 | Lew | 73/861.05 |
| 4,884,441 | 12/1989 | Lew | 73/195 |
| 4,910,994 | 3/1990 | Lew | 73/1 B |
| 4,911,019 | 3/1990 | Lew | 73/861.24 |
| 4,926,695 | 5/1990 | Kelven et al. | 73/861.24 |
| 4,941,361 | 7/1990 | Lew | 73/861.24 |
| 4,970,902 | 11/1990 | Misumi et al. | 73/861.23 |
| 4,973,062 | 11/1990 | Lew | 73/861.24 |
| 4,986,134 | 1/1991 | Lew | 73/861.24 |
| 5,005,426 | 4/1991 | Lew | 73/861.22 |
| 5,022,257 | 6/1991 | Lew | 73/3 |
| 5,090,251 | 2/1992 | Lew | 73/861.24 |
| 5,095,760 | 3/1992 | Lew | 73/861.24 |
| 5,109,704 | 5/1992 | Lew | 73/861.24 |
| 5,186,056 | 2/1993 | Lew | 73/861.24 |
| 5,237,877 | 8/1993 | Lew | 73/861.24 |
| 5,247,838 | 9/1993 | Vander Heyden et al. | 73/861.24 |
| 5,291,780 | 3/1994 | Thomas et al. | 73/195 |
| 5,347,873 | 9/1994 | Vander Heyden | 73/861.22 |
| 5,359,901 | 11/1994 | Lew et al. | 73/861.38 |
| 5,419,189 | 5/1995 | Lew et al. | 73/195 |

FOREIGN PATENT DOCUMENTS

| | | |
|---|---|---|
| 0 547 577 A1 | 6/1993 | European Pat. Off. . |
| 7-306066 | 11/1995 | Japan . |
| WO 90/13007 | 11/1990 | WIPO . |

OTHER PUBLICATIONS

J.P. Bentley and A.R. Nichols, "The Mapping of Vortex Fields Around Single and Dual Bluff Bodies", *Flow Measure Instruments*, vol. 1, Oct. 1990.

J.P. Bentley, R.A. Benson and A.J. Shanks, "The Development of Dual Bluff Body Vortex Flowmeters", *School of Science and Technology, The University of Teesside*, Middlesbrough TS1 3BA, UK, Aug. 27, 1996, pp. 85–90.

George J. Blickley, "Vortex Flowmeters Provide Higher Accuracy, Lower Pressure Drops", *Control Engineering*, Nov. 1995.

"Fundamentals of Flow Metering", *Rosemount Comprehensive Product Catalog*, 00805–0010–1025, English, Jan. 1997, pp. reference 15–reference 24.

"Model 8800A Smart Vortex Flowmeter", *Rosemount Comprehensive Product Catalog*, 00805–0100–1025, English, Jan. 1997, pp. Flow 171–Flow 190.

*Primary Examiner*—Harshad Patel
*Attorney, Agent, or Firm*—Westman, Champlin & Kelly, P.A.

[57] ABSTRACT

A multiple flow metering system includes first and second vortex flowmeters for measuring a flow of a fluid. The first vortex flowmeter includes a first bluff body having a leading edge and a shape for inducing a first stream of vortices in the fluid as a function of the flow at a wavelength $\lambda$. The first vortex flowmeter also includes a first vortex sensor which generates a first output based on a frequency of the first stream of vortices. The second vortex flowmeter includes a second bluff body having a leading edge and a shape for inducing a second stream of vortices in the fluid as a function of the flow at the wavelength $\lambda$. The second vortex flowmeter also includes a second vortex sensor which generates a second output based on the frequency of the second stream of vortices. The leading edge of the second body is spaced from the leading edge of the first body by 1.15$\lambda$ to 2.0$\lambda$.

9 Claims, 7 Drawing Sheets

MULTIPLE VORTEX FLOWMETER SYSTEM

BACKGROUND OF THE INVENTION

The present invention relates to vortex flowmeters and, more particularly, to the use of two vortex flowmeters in tandem.

Vortex flowmeter systems are used in the industrial process control field for measuring flow rate of a fluid. Vortex flowmeters are typically inserted in a flow pipe or conduit that carries the fluid to be measured. Industry applications include petroleum, chemical, pulp and paper, mining and materials, oil and gas. The fluids to be measured are often hazardous, and may be flammable or explosive. The fluids may also include condensate, deposits and other properties that can make flow measurements difficult. In these applications, safety and measurement accuracy are critical.

The operating principal of a vortex flowmeter is based on a phenomenon of vortex shedding known as von Karman effect. As fluid passes a bluff body, it separates and generates small eddies or vortices that are shed alternately along and behind each side of the bluff body. These vortices cause areas of fluctuating pressure that are detected by a sensor. While the frequency of vortex generation is essentially proportional to fluid velocity, this proportionality varies slightly with the conduit Reynolds number. The conduit Reynolds number is a function of the fluid density, the fluid viscosity, the fluid velocity, and the inside diameter of the conduit. The slight variations in the proportionality induce non-linearity in the frequency output of a vortex flowmeter as a function of flow rate.

Vortex flowmeters are also susceptible to characteristic changes after installation due to coating of the bluff body, erosion of the bluff body and other dimensional changes which may cause drift in the measured frequency or other fault conditions. Drift in the measured output is particularly difficult to detect without recalibrating the meter.

Vortex flowmeter systems have been proposed that use two vortex flowmeters in series with one another, such that the outputs can be compared. However, the use of two vortex flowmeters can adversely affect each other due to the vortices generated by the upstream flowmeter.

Thus, there is a need for an improved dual flow metering system which has greater linearity and in which fault conditions are more easily detectable on-line during normal operation.

SUMMARY OF THE INVENTION

The multiple flow metering system of the present invention includes first and second vortex flowmeters for measuring flow of a fluid. The first vortex flowmeter includes a first bluff body having a leading edge and a shape for inducing a first stream of vortices in the fluid as a function of the flow at a wavelength $\lambda$. The first vortex flowmeter also includes a first vortex sensor which generates a first output based on a frequency of the first stream of vortices. The second vortex flowmeter includes a second bluff body having a leading edge and a shape for inducing a second stream of vortices in the fluid as a function of the flow at the wavelength $\lambda$. The second vortex flowmeter also includes a second vortex sensor which generates a second output based on the frequency of the second stream of vortices. The leading edge of the second body is spaced from the leading edge of the first body by $1.15\lambda$ to $2.0\lambda$.

DETAILED DESCRIPTION OF THE PREFERRED EMBODIMENTS

Figure 1:
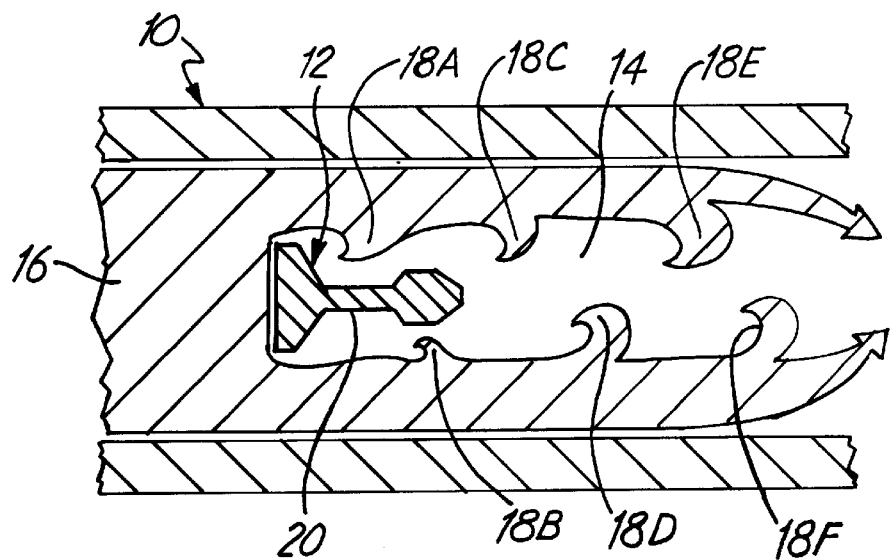
FIG. 1 is a cross section of a flow conduit with a bluff body shedding vortices.

FIG. 1 is a cross section of a flow conduit 10 which illustrates the operating principal of a vortex flowmeter of a type that can be used in tandem with another vortex flowmeter according to the present invention. The flowmeter includes a bluff body 12 which is positioned within a flow passage 14 of flow conduit 10. As fluid 16 flows past bluff body 12, the shape of bluff body 12 causes fluid 16 to divide and shed an alternating stream of vortices 18A–18F along and behind each side of bluff body 12. Fluid 16 fills flow passage 14, but is shown separated in FIG. 1 to illustrate the formation of vortices 18A–18F. The frequency of vortex generation is proportional to the velocity of fluid 16 in flow passage 14. The formation of vortices 18A–18F causes alternating pressure to be exerted on a small flexure section 20 of bluff body 12 at the same frequency as the formation of vortices. A sensor (not shown in FIG. 1) senses the alternating forces on flexure section 20 and generates a signal having a frequency that is proportional to the frequency of vortex generation and thus the flow rate of fluid 16.

Figure 2:
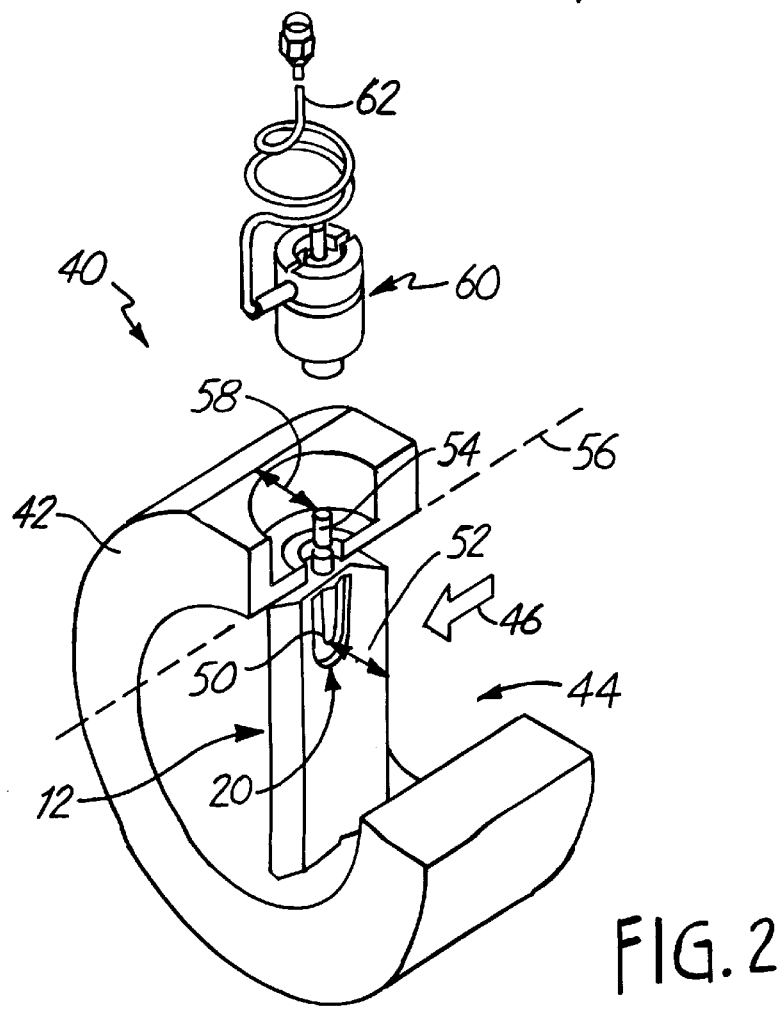
FIG. 2 is a perspective, fragmentary view of a single vortex flowmeter.

FIG. 2 is a perspective, fragmentary view of a single vortex flowmeter illustrating the structure of the bluff body and sensor in greater detail according to one embodiment of the present invention. Vortex flowmeter 40 includes spool 42 which is adapted to be secured between two sections of a flow conduit 10 (shown in FIG. 1). Spool 42 can be welded to the flow conduit or secured by bolts through a flange assembly, for example. Spool 42 has an inner diameter which defines a flow passage 44. Fluid flows through flow passage 44 in a direction indicated by arrow 46. The inner diameter of flow passage 44 matches or, more preferably, is slightly smaller than the diameter of flow passage 14 of the flow conduit to which it is attached.

Bluff body 12 extends transversely across flow passage 44 and is secured at both ends to the inner diameter surface of spool 42. The small flexure section 20 includes a thin sensing diaphragm 50 which is supported along peripheral portions by the bluff body 12. Sensing diaphragm 50 is open to the fluid for deflecting laterally in the direction of arrows 52 in response to the alternating forces applied by the vortices shed by bluff body 12. A beam 54 is coupled to sensing diaphragm 50 for transferring deflection of sensing diaphragm 50 through spool 42. Beam 54 rotates or "rocks" about a pivot axis 56 in response to deflection of sensing diaphragm 50, thereby applying a lateral force 58 on a piezoelectric sensor 60 attached to spool 42. Piezoelectric sensor 60 senses the lateral movement of beam 54 and generates a piezoelectric sensor signal on output 62 having a frequency that is representative of the frequency of vortex shedding and thus the flow rate of the fluid flowing through flow passage 44.

Vortex flowmeter 40 is described in greater detail in Kleven et al. U.S. Pat. No. 4,926,695, which is hereby incorporated by reference. In one embodiment, vortex flowmeter 40 includes a Model 8800A Smart Vortex Flowmeter available from Rosemount Inc. of Eden Prairie, Minn., which is described in the Fisher-Rosemount™ *Comprehensive Product Catalog*, pp. FLOW-171 to FLOW-190 (January 1997).

Figure 3:
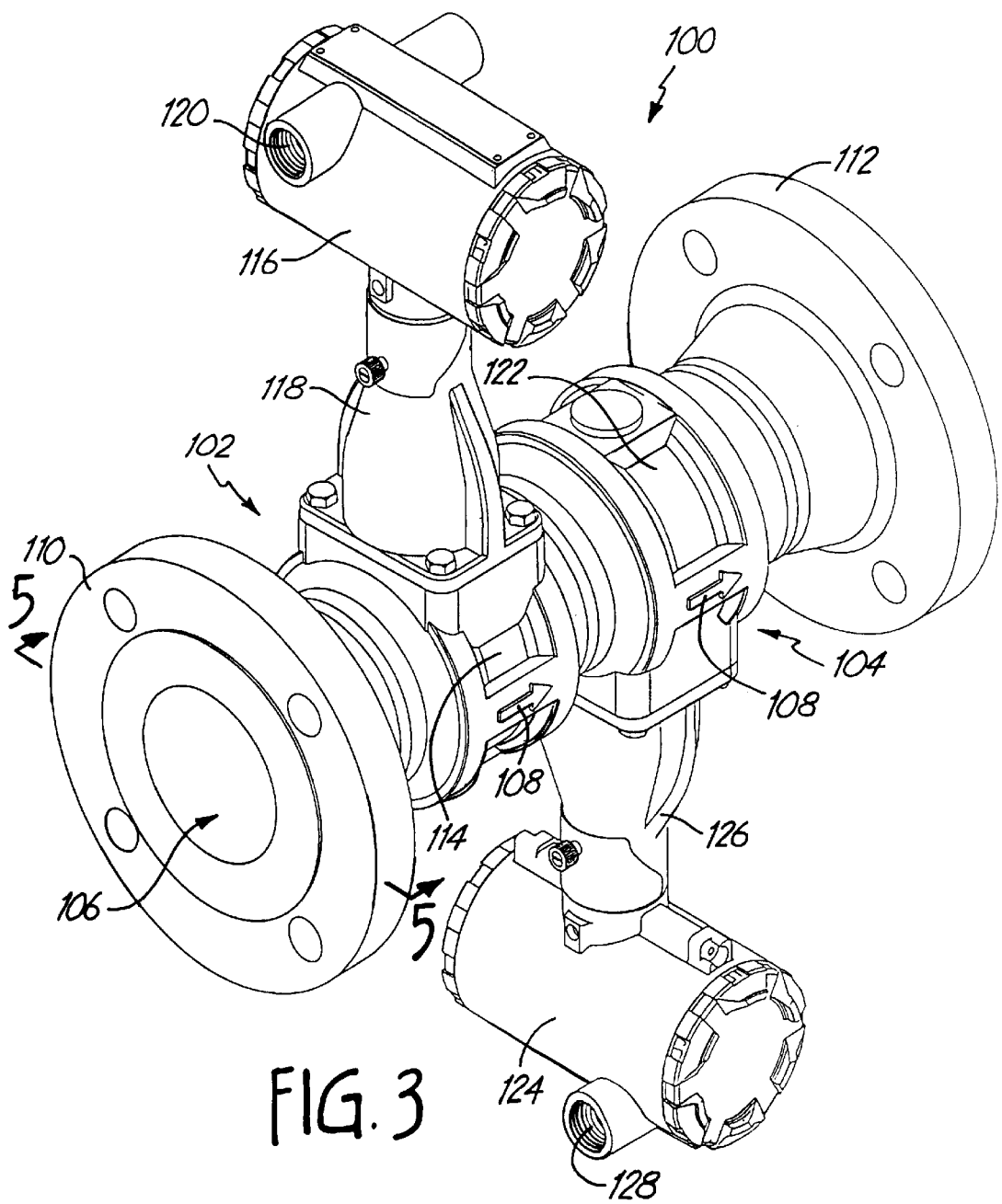
FIG. 3 is a perspective view of a dual flow metering system according to one embodiment of the present invention.

With the present invention, redundancy and reduced non-linearity in output 62 are accomplished by installing two or more vortex flowmeters in close proximity to one another. FIG. 3 is a perspective view of a dual flow metering system 100 according to one embodiment of the present invention. Flow metering system 100 includes a first vortex flowmeter 102 and a second vortex flowmeter 104 which are welded or bolted together, for example, and have a common flow passage 106. The flow direction through flow passage 106 is indicated by arrows 108. Flanges 110 and 112 are attached to vortex flowmeters 102 and 104 to facilitate connection of flow metering system 100 between two sections of a flow conduit containing a fluid to be measured. In an alternative embodiment, vortex flowmeters 102 and 104 are connected directly to the flow conduit with no flanges.

In one embodiment, vortex flowmeters 102 and 104 are identical to one another. Vortex flowmeter 102 is upstream of vortex flowmeter 104 relative to the direction of fluid flow. Vortex flowmeter 102 includes a spool 114, an electronics housing 116 and a housing-to-spool adapter 118. Housing-to-spool adapter 118 structurally secures electronics housing 116 to spool 114. Vortex flowmeter 102 further includes a bluff body and piezoelectric sensor similar to bluff body 12 and piezoelectric sensor 60 shown in FIG. 2. Output 62 from piezoelectric sensor 60 is routed through housing-to-spool adapter 118 to an electronics module within electronics housing 116. Electronics housing 116 is an explosion-proof housing and has an access port 120 for accessing a terminal compartment for making electrical connections to the electronics module within housing 116.

Figure 4:
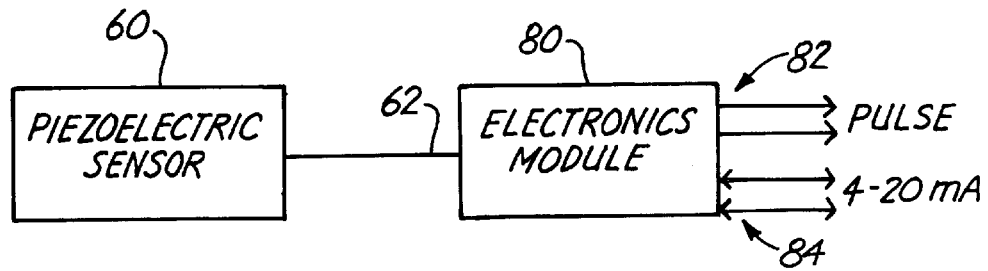
FIG. 4 is a block diagram illustrating an electronics module in one of the flowmeters of the present invention.

FIG. 4 shows the electrical connection between piezoelectric sensor 60 and electronics module 80 within electronics housing 116. Electronics module 80 receives the piezoelectric sensor signal from output 62, digitizes the signal and passes the digital signal through a digital filter. The frequency of pulses in the filtered digital signal represents the frequency of vortex shedding and thus the fluid flow rate through flow passage 106. A microprocessor in electronics module 80 receives the filtered digital signal and converts it to a desired output format. In one embodiment, electronics module 80 provides a pulse output 82 which is scalable from zero to 10,000 Hz. Pulse output 82 can be monitored by an electrical or mechanical pulse counter. The microprocessor in electronics module 80 can also provide a 4–20 mA analog output 84. The microprocessor varies the level of current flowing through output 84 as a function of the frequency of the filtered digital signal. The 4–20 mA analog output can be coupled to a central controller or a valve controller, for example, over a process control loop. The microprocessor can also communicate digitally over 4–20 mA analog output 84 via the HART™ protocol, which uses an industry standard Bell 202 Frequency Shift Keying (FSK) technique to superimpose a high-frequency signal on top of the 4–20 mA output signal. Other protocols can also be used.

Referring back to FIG. 3, vortex flowmeter 104 includes a spool 122, an electronics housing 124 and a housing-to-spool adapter 126. Housing-to-spool adapter 126 structurally secures electronics housing 124 to spool 122. The flow passage through spool 122 is axially aligned with the flow passage through spool 114. Vortex flowmeter 104 further includes a bluff body and piezoelectric sensor similar to bluff body 12 and piezoelectric sensor 60 shown in FIG. 2. Output 62 from the piezoelectric sensor mounted to spool 122 is routed through housing-to-spool adapter 126 to an electronics module within electronics housing 124. Electronics housing 124 has an access port 128 for making electrical connections to the electronics module within housing 124. The electronics module within electronics housing 124 provides a pulse output and a 4–20 mA analog output like those discussed with reference to vortex flowmeter 102.

Flow metering system 100 therefore provides redundant flow measurements, one from flowmeter 102 and one from flowmeter 104. Among the advantages of such a multiple flowmeter configuration is the capability of comparing the outputs of each flowmeter to determine whether a fault condition has occurred. A fault condition in one flowmeter does not result in the loss of the flow measurement since a usable output or outputs is available from the other flowmeter or flowmeters. This configuration is also particularly useful in detecting fault conditions where a shift in the output of one or more of the flowmeters has occurred, but not a total failure of the flowmeter.

Figure 5:
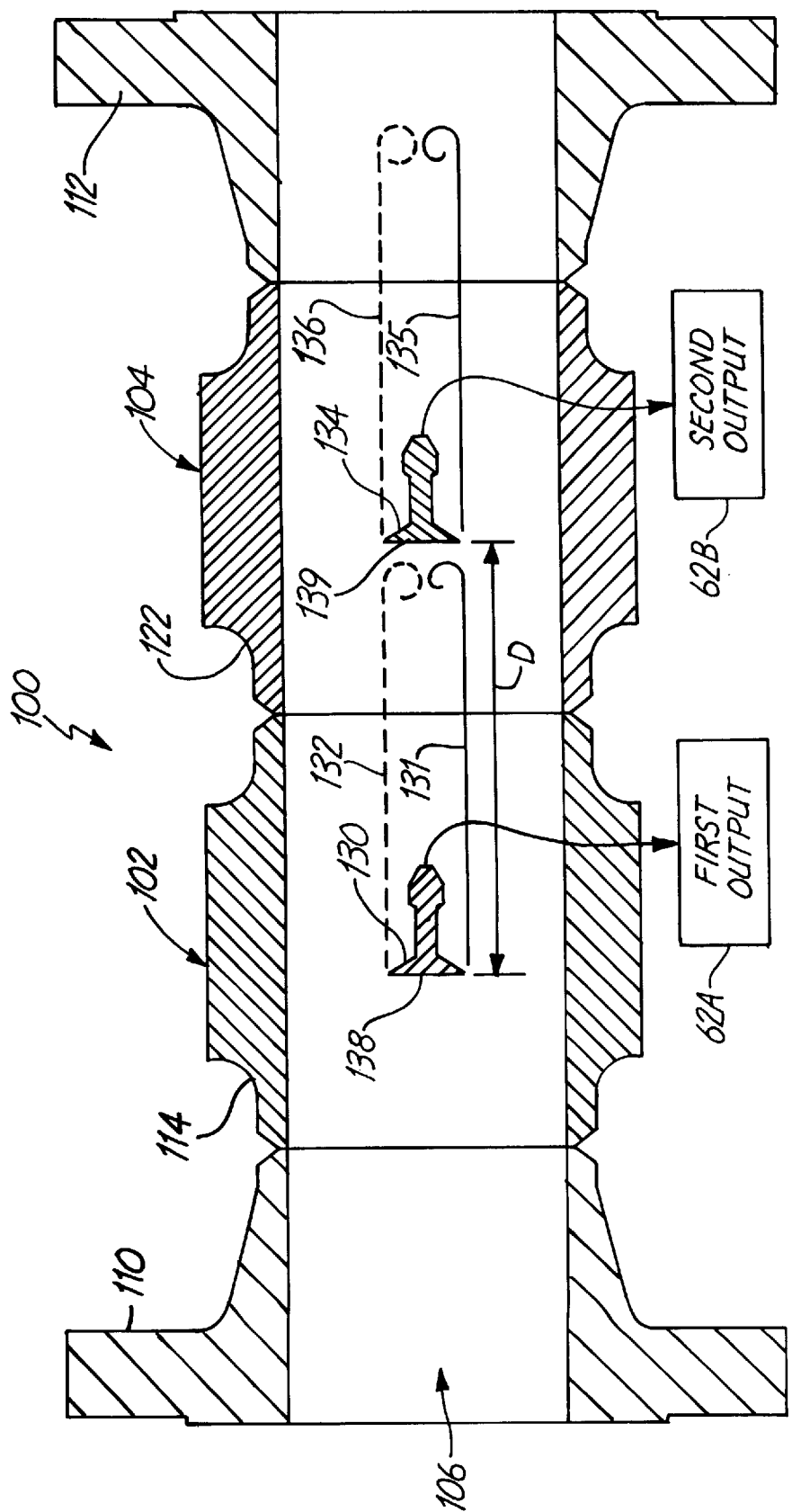
FIG. 5 is a cross sectional view of the dual flow metering system taken along lines 5—5 of FIG. 3.

FIG. 5 is a cross sectional view of dual flow metering system 100 taken along lines 5—5 of FIG. 3 which shows the spacing between the bluff bodies in vortex flowmeters 102 and 104 in greater detail. Vortex flowmeter 102 has a bluff body 130 which sheds alternating streams of vortices 131 and 132 (shown in phantom). Vortices 131 and 132 have a wavelength $\lambda$. Vortex flowmeter 102 senses the frequency of alternating vortices 131 and 132 and generates an output 62A which is representative of the sensed frequency. Similarly, vortex flowmeter 104 has a bluff body 134 which sheds alternating vortices 135 and 136 (shown in phantom). Vortex flowmeter 104 senses the frequency of alternating vortices 135 and 136 and generates an output 62B which is representative of the sensed frequency.

Leading edge 138 of bluff body 130 is spaced from leading edge 139 of bluff body 134 by a distance D. Distance D is preferably $1.15\lambda$ to $2.0\lambda$. It has been found that spacing the vortex flowmeters $1.15\lambda$ to $2.0\lambda$ apart results in a decrease in the non-linearity of the combination of flowmeters.

Figure 6:
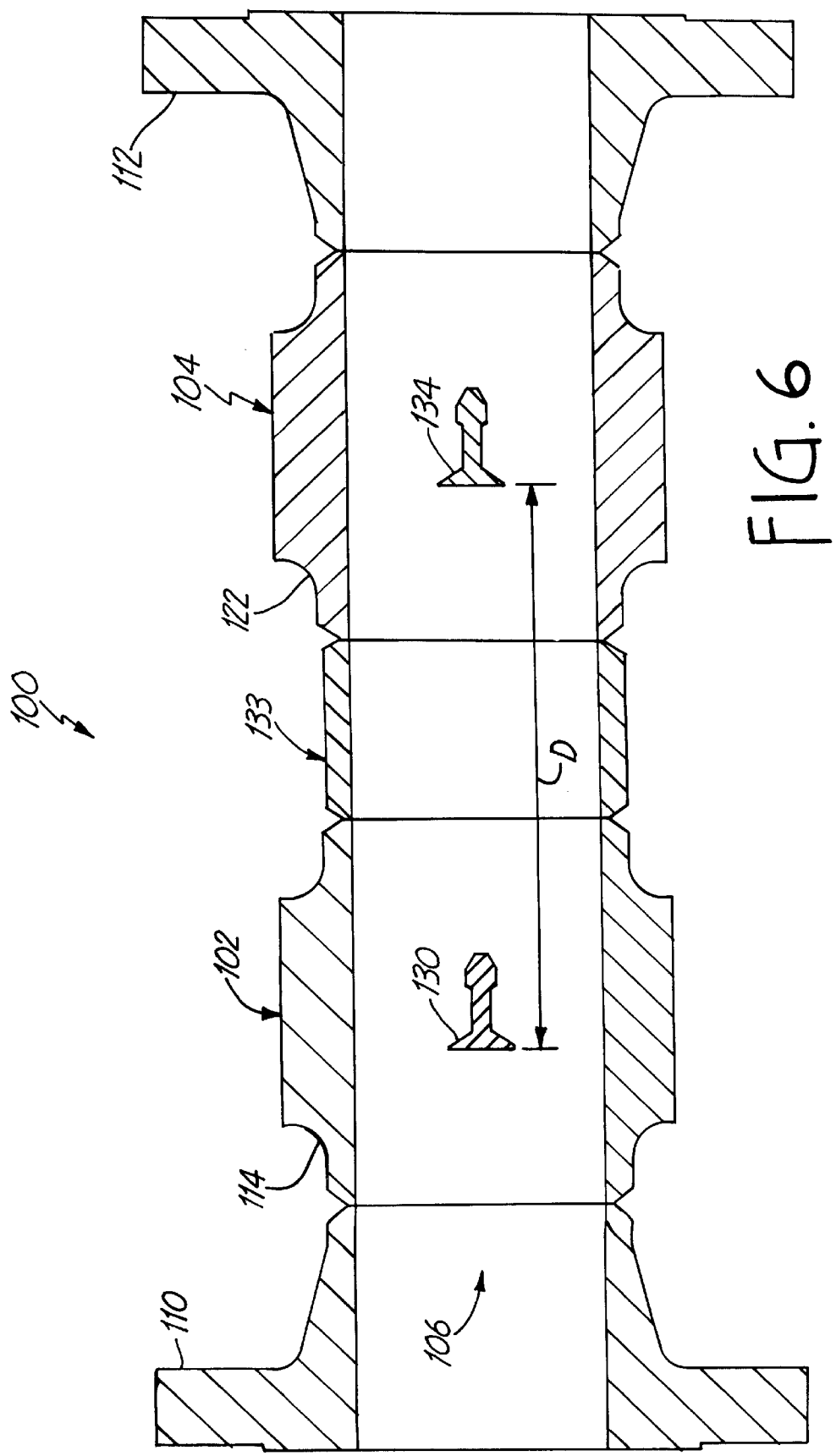
FIG. 6 is a cross sectional view of the dual flow metering system with a spacing conduit.

The desired spacing can be accomplished by appropriately sizing the length of spools 114 and 126 along flow passage 106 or by the use of gaskets or a spacing conduit between vortex flowmeters 102 and 104, as shown in FIG. 6. In FIG. 6, spacing conduit 133 is welded between vortex flowmeters 102 and 104, for example.

Figure 7:
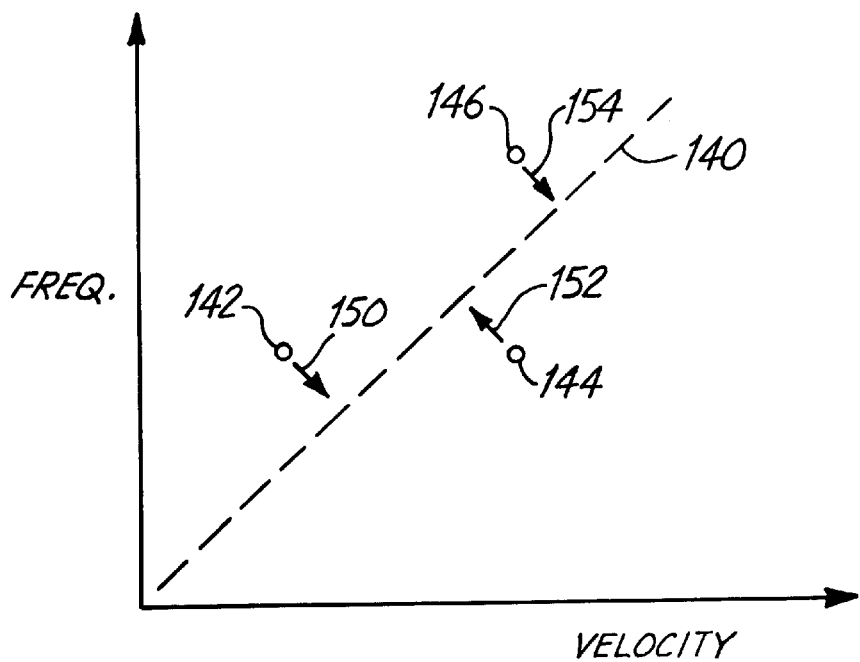
FIG. 7 is a prophetic graph illustrating measured frequency of vortex shedding as a function of fluid velocity according to the present invention.

FIG. 7 is a prophetic graph illustrating the frequency of vortex shedding measured by one of the vortex flowmeters 102 or 104 as a function of fluid velocity. Line 140 (shown in phantom) designates a desired linear response from the vortex flowmeter. Points 142, 144 and 146 represent frequency measurements at three different flow velocities. The distance of points 142, 144 and 146 from line 140 represents non-linearity in the measured output. When two vortex flowmeters are placed 1.15λ to 2.0λ apart from one another, a reduction in the non-linearity of the frequency measurement of the combination is found, and the frequencies of vortex shedding from the two bluff bodies tend to track one another more closely. Points 142, 144 and 146 tend to move closer to line 140, as represented by arrows 150, 152 and 154.

Figure 8:
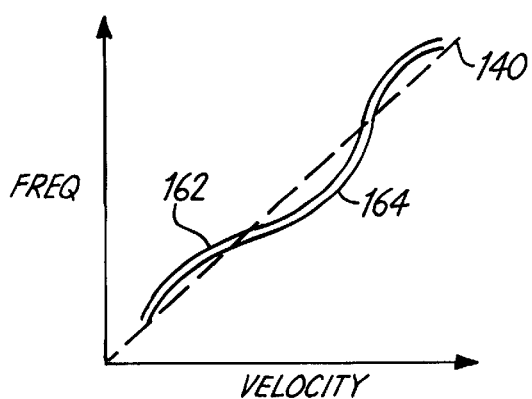
FIG. 8 is a prophetic graph illustrating improved tracking between two vortex flowmeters spaced within a preferred range according to the present invention.
Figure 9:
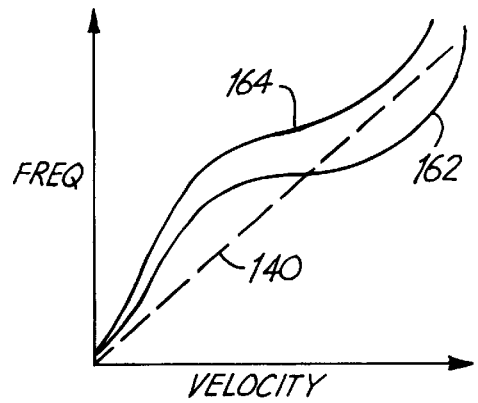
FIG. 9 is a prophetic graph illustrating tracking between two vortex flowmeters spaced outside the preferred range.

FIG. 8 is a prophetic graph which illustrates the improved tracking between vortex flowmeters 102 and 104. Again, the measured frequency of vortex shedding is plotted as a function of flow velocity. Line 160 represents the measured output of vortex flowmeter 102, while line 162 represents the measured output of vortex flowmeter 104. The measured outputs track closely to one another. FIG. 9 is a prophetic graph illustrating the tracking between vortex flowmeters 102 and 104 when the flowmeters are spaced from one another by a distance that is outside the preferred range. Although the measured outputs generally follow the desired output 140, they do not track one another as well as when the flowmeters are spaced within the desired range. The waveforms in FIGS. 7–9 are exaggerated for ease of description.

Figure 10:
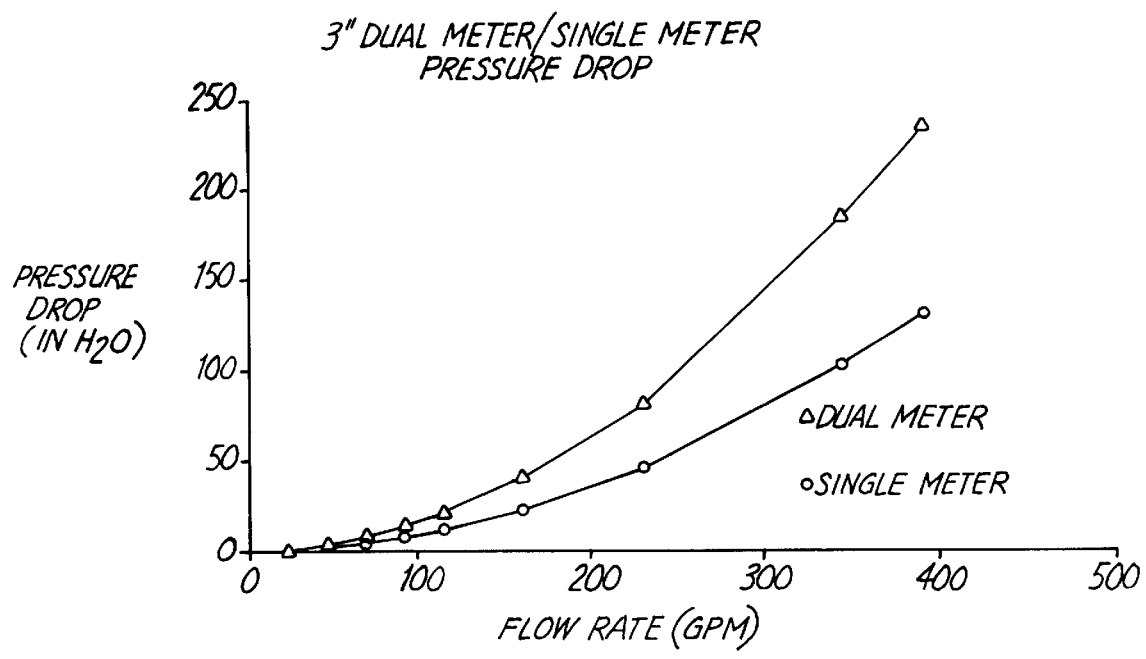
FIG. 10 is a graph illustrating test data of pressure drop as a function of flow rate of the flow metering system of the present invention.

The preferred spacing vortex flowmeters 102 and 104 also results in a reduction in head pressure effects. FIG. 10 is a graph illustrating test data of pressure drop (inches) as a function of flow rate (GPM) Line 170 represents the pressure drop across dual flow metering system 100, and line 172 represents the pressure drop across a single one of the flowmeters for a 3 inch diameter flow passage. Although the use of two vortex flowmeters in tandem increases the pressure drop as compared to a single vortex flowmeter, the increase is less than twice that of the single vortex flowmeter when the two vortex flowmeters are spaced from one another in the preferred range. Redundancy can therefore be provided without doubling the head pressure drop through the flow metering system.

Figure 11:
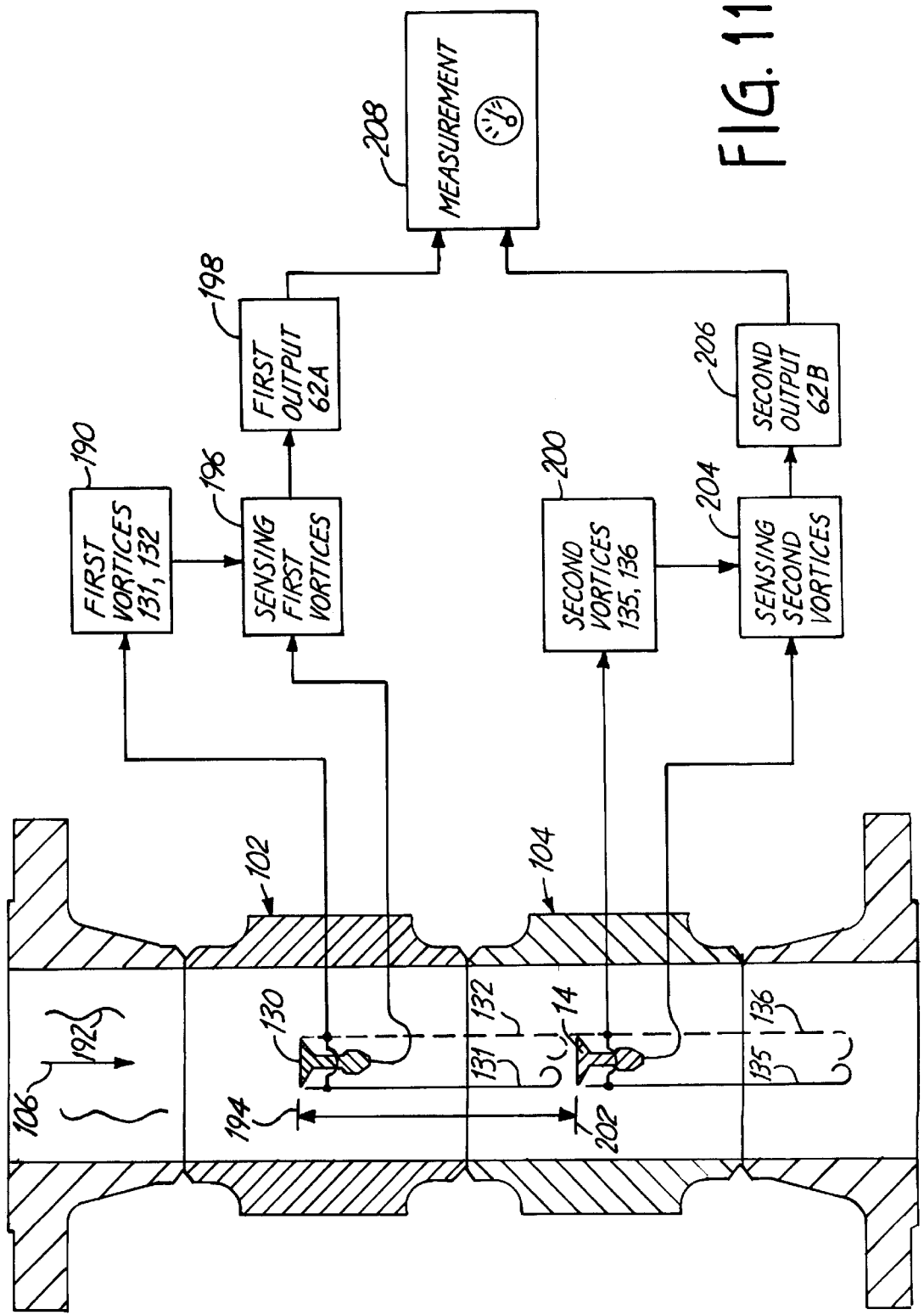
FIG. 11 is a block diagram illustrating a method of decreasing non-linearity in a dual vortex flow metering system.

FIG. 11 is a block diagram illustrating a method of decreasing non-linearity in a dual vortex flow metering system according to one embodiment of the present invention. The method includes inducing a first stream of vortices 131 and 132, at step 190, in a fluid 192 flowing through flow conduit 106 as a function of the flow at a wavelength X with flowmeter 102 at a first axial location 194 along the flow conduit; sensing a frequency of the first stream of vortices 131 and 132 with flowmeter 102, at step 196; generating output 62A based on the sensed frequency of the first stream of vortices 131 and 132, at step 198; inducing a second stream of vortices 135 and 136, at step 200 in fluid 192 as a function of the flow with flowmeter 104 at a second axial location 202 along the flow conduit, which is spaced 1.15λ to 2.0λ downstream of the first axial location 194; sensing a frequency of the second stream of vortices 135 and 136 with flowmeter 104, at step 204; generating output 62B based on the sensed frequency of the second stream of vortices 135 and 135, at step 206; and generating a flow measurement based on at least one of the outputs 62A and 62B, at step 208.

Vortex flowmeters are often used in harsh environments which can include a wide range of process temperatures and pressures. Typical industry applications include petroleum, chemical, pulp and paper, mining and materials industry, oil and gas. The fluids to be measured may include condensate, deposits and other properties that can lead to deterioration of the flowmeter elements, such as erosion of or condensation on the bluff body. The redundancy and improved accuracy achieved by the present invention is therefore particularly helpful in these harsh environments. The redundancy also provides the capability to detect drift in one of the flowmeters by comparing the outputs of the two flowmeters. Detection of drift can be used to signal an alarm that a fault condition has or may be occurring so that one or both of the flowmeters can be cleaned, recalibrated or replaced. The flow metering system of the present invention can be used with virtually any line size, such as from ½ inch to 8 inch line sizes.

Although the present invention has been described with reference to preferred embodiments, workers skilled in the art will recognize that changes may be made in form and detail without departing from the spirit and scope of the invention. For example, the present invention can be used with other types and structures of vortex flowmeters.

What is claimed is:

1. A multiple flow metering system for providing first and second outputs indicative of a fluid flow, the multiple flow metering system comprising:

a first vortex flowmeter comprising a first body having a leading edge and a shape for inducing a first stream of vortices in the fluid as a function of the flow at a wavelength λ and a first vortex sensor disposed in said first body and generating the first output based on a frequency of the first stream of vortices; and a second vortex flowmeter comprising a second body having a leading edge and a shape for inducing a second stream of vortices in the fluid as a function of the flow and a second vortex sensor disposed in said second body and generating the second output based on a frequency of the second stream of vortices, wherein the leading edge of the second body is spaced from the leading edge of the first body by 1.15λ to 2.0λ of the first stream of vortices such that the frequencies of the first and second streams of vortices and thus the first and second outputs substantially track one another.

2. The multiple flow metering system of claim 1 wherein:

the first vortex flowmeter comprises a first spool having a first flow passage in which the first body is positioned;

the second vortex flowmeter comprises a second spool having a second flow passage in which the second body is positioned; and the first and second spools are secured together such that the second flow passage is axially aligned with and downstream from the first flow passage relative to the flow.

3. The multiple flow metering system of claim 2 and further comprising a spacing conduit, wherein the first and second spools are secured together through the spacing conduit which has a length that is selected such that the leading edge of the second body in the second spool is spaced from the leading edge of the first body in the first spool by 1.15λ to 2.0λ.

4. The multiple flow metering system of claim 2 and further comprising a flow conduit secured to the first spool, upstream from the first and second spools relative to the flow, and having a third flow passage with a larger diameter than the first and second flow passages.

5. The multiple flow metering system of claim 1 wherein the first and second vortex sensors each comprise a sensing diaphragm formed in the first and second bodies, respectively, and being supported at peripheral portions on the first and second bodies and open to the fluid for deflecting laterally in response to the first and second streams of vortices, respectively.

6. A multiple flow metering system for sensing fluid flow through a flow conduit, the multiple flow metering system comprising:

first vortex flowmeter means, including a first body and a first sensing means, disposed at a first axial location along the flow conduit for inducing a first stream of vortices in the fluid as a function of the flow at a wavelength $\lambda$ and for sensing a frequency of the first stream of vortices, respectively and second vortex flowmeter means, including a second body and a second sensing means, disposed at a second axial location along the flow conduit for inducing a second stream of vortices in the fluid as a function of the flow and for sensing a frequency of the second stream of vortices, respectively wherein the first axial location is spaced from the second axial location by $1.15\lambda$ to $2.0\lambda$ of the first stream of vortices such that the sensed frequency of the second stream of vortices substantially tracks the sensed frequency of the first stream of vortices.

7. The multiple flow metering system of claim 6 wherein the first and second vortex flowmeter means are identical to one another.

8. A method of decreasing non-linearity in a multiple vortex flow metering system, the method comprising:

inducing a first stream of vortices in a fluid flowing through a flow conduit as a function of the flow at a wavelength $\lambda$ with a first flowmeter, having a first body and a first sensor disposed in said first body, at a first axial location along the flow conduit;

sensing a frequency of the first stream of vortices with the first flowmeter sensor;

generating a first output based on the sensed frequency of the first stream of vortices;

inducing a second stream of vortices in the fluid as a function of the flow with a second flowmeter, having a second body and a second sensor disposed in said second body, at a second axial location along the flow conduit, which is spaced $1.15\lambda$ to $2.0\lambda$ downstream of the first axial location such that the second stream of vortices has a frequency that substantially tracks the frequency of the first stream of vortices;

sensing the frequency of the second stream of vortices with the second flowmeter sensor;

generating a second output based on the sensed frequency of the second stream of vortices that substantially tracks the first output; and generating a flow measurement based on at least one of the first and second outputs.

9. The multiple flow metering system of claim 1 wherein the first and second vortex flowmeters are identical to one another.

* * * * *

UNITED STATES PATENT AND TRADEMARK OFFICE
CERTIFICATE OF CORRECTION

PATENT NO. : 6,053,053
DATED : April 25, 2000
INVENTOR(S) : Wendell G. Huotari

It is certified that error appears in the above-identified patent and that said Letters Patent is hereby corrected as shown below:

ON THE TITLE PAGE:

Item [56] should read -References Cited

U.S. Patent Documents

--4,926,695  5/1990  Kleven . . . . 73/861.24--

Signed and Sealed this

Twenty-seventh Day of March, 2001

Attest:

NICHOLAS P. GODICI

Attesting Officer      Acting Director of the United States Patent and Trademark Office